US011840116B2

(12) United States Patent
Bill

(10) Patent No.: US 11,840,116 B2
(45) Date of Patent: Dec. 12, 2023

(54) AIRCRAFT SYSTEM AND METHOD

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/409,569

(22) Filed: Aug. 23, 2021

(65) Prior Publication Data

US 2022/0134816 A1 May 5, 2022

(30) Foreign Application Priority Data

Oct. 30, 2020 (GB) ..................................... 2017248

(51) Int. Cl.
*B60C 23/04* (2006.01)
*B64F 5/60* (2017.01)
*B64D 45/00* (2006.01)
*G08B 3/00* (2006.01)
*G08B 5/38* (2006.01)
*G08C 17/02* (2006.01)

(52) U.S. Cl.
CPC ...... *B60C 23/0479* (2013.01); *B60C 23/0401* (2013.01); *B60C 23/0406* (2013.01); *B60C 23/0427* (2013.01); *B60C 23/0471* (2013.01); *B64D 45/00* (2013.01); *B64F 5/60* (2017.01); *G08B 3/00* (2013.01); *G08B 5/38* (2013.01); *G08C 17/02* (2013.01); *B60C 2200/02* (2013.01)

(58) Field of Classification Search
CPC ............ B60C 23/0479; B60C 23/0401; B60C 23/0406; B60C 23/0427; B60C 23/0471; B60C 2200/02; B64F 5/60; B64D 45/00; G08B 3/00; G08B 5/38; G08C 17/02
USPC ......................................................... 340/945
See application file for complete search history.

(56) References Cited

U.S. PATENT DOCUMENTS

| | | | |
|---|---|---|---|
| 4,059,823 A | 11/1977 | Martin et al. | |
| 4,734,674 A * | 3/1988 | Thomas | B60C 23/0496 340/447 |
| 6,087,930 A | 7/2000 | Kulka et al. | |
| 8,599,044 B2 | 12/2013 | Maggiore et al. | |

(Continued)

FOREIGN PATENT DOCUMENTS

| | | |
|---|---|---|
| CN | 111 361 363 | 7/2020 |
| EP | 2 910 393 | 8/2015 |

(Continued)

OTHER PUBLICATIONS

Combined Search and Examination Report for GB Application No. 2017248.2, 7 pages, dated Mar. 5, 2021.

(Continued)

*Primary Examiner* — Kam Wan Ma
(74) *Attorney, Agent, or Firm* — Nixon & Vanderhye P.C.

(57) ABSTRACT

A method of communicating configuration data of a tire pressure monitoring device configured to be affixed to a wheel is disclosed. The method includes, at the tire pressure monitoring device, receiving a request to confirm configuration data, and responsive to receipt of the request to confirm configuration data, transmitting a configuration data signal which encodes the configuration data. The configuration data signal is configured to be received and understood by a human.

16 Claims, 11 Drawing Sheets

(56) References Cited

U.S. PATENT DOCUMENTS

| | | |
|---|---|---|
| 2004/0069057 A1 | 4/2004 | Sapir |
| 2007/0188315 A1 | 8/2007 | Chung |
| 2007/0193349 A1 | 8/2007 | Petrucelli |
| 2009/0109012 A1 | 4/2009 | Petrucelli |
| 2010/0090878 A1* | 4/2010 | Teuling .................. G08C 19/28 341/176 |
| 2014/0070928 A1 | 3/2014 | Yu et al. |
| 2021/0039450 A1 | 2/2021 | Dages et al. |
| 2022/0055420 A1 | 2/2022 | Bill |

FOREIGN PATENT DOCUMENTS

| | | | |
|---|---|---|---|
| EP | 3 069 903 | 9/2016 | |
| EP | 3 118 030 | 1/2017 | |
| EP | 3 150 408 | 4/2017 | |
| EP | 3 498 501 | 6/2019 | |
| EP | E P-3498501 A1 * | 6/2019 | ......... B60C 23/0403 |
| EP | 3 991 996 | 5/2022 | |
| GB | 2 490 302 | 10/2012 | |
| GB | 2 584 847 | 12/2020 | |
| JP | 2003291615 | 10/2003 | |
| WO | 2017/179968 | 10/2017 | |

OTHER PUBLICATIONS

Extended European Search Report for Application No. GB 21192517.7, seven pages, dated Dec. 17, 2021.
Extended European Search Report for EP Application No. 22305400.8, seven pages, dated Sep. 22, 2022.
Combined Search and Examination Report for Application No. GB2115730.0, nine pages, dated Mar. 1, 2022.

\* cited by examiner

AIRCRAFT SYSTEM AND METHOD

CROSS RELATED APPLICATION

This application claims priority to United Kingdom Patent Application GB 2017248.2, filed Oct. 30, 2020, the entire content of which is hereby incorporated by reference.

TECHNICAL FIELD

The present invention relates to tire pressure monitoring devices, and methods of communicating configuration data from tire pressure monitoring devices.

BACKGROUND

Checking tire pressure is an important part of the maintenance of a vehicle. Tire pressures should be maintained at predetermined pressures to ensure that a tire performs as intended by the manufacturer. Incorrect tire pressure can lead to a tire failing, perhaps bursting and causing damage to the vehicle and/or a loss of control. To check a tire pressure it is important to know what reference pressure is defined for the tire.

SUMMARY

A first aspect of the present invention provides a method of communicating configuration data of a tire pressure monitoring device configured to be affixed to a wheel in use. The method comprises, at the tire pressure monitoring device: receiving a request to confirm configuration data; responsive to receipt of the request to confirm configuration data, transmitting a configuration data signal which encodes the configuration data; wherein the configuration data signal is configured to be received and understood by a human.

This allows the data from the tire pressure monitoring device to be confirmed without requiring intermediate devices to interpret or display the data. In particular, it may be necessary to ensure that configuration data has been correctly entered into a tire pressure monitoring device in a way which can be trusted. By reducing intermediate devices, then the requirement for intermediate devices to also be trusted is removed. For example, in aircraft, in order to obtain a desired Development Assurance Level (DAL, for example DAL B) for a vehicle tire system a strict certification is required. It is desirable to reduce intermediate devices to provide a robust system while reducing certification requirements. Reducing intermediate devices may reduce the cost of a system, may reduce the cost of manufacture of a system, and may reduce the cost of operation in use.

By transmitting the configuration data signal from the tire pressure monitoring device, it can be ensured that the configuration data signal has come from a known, trusted, source. Furthermore, by ensuring that the configuration data signal is configured to be received and understood by a human, the need for a trusted device may be reduced and/or eliminated. Thus the required DAL may be achieved without the need for an additional trusted device, and the human receiving the data may verify the data. Untrusted information sources cannot be used to directly verify data when DAL is required in view of their untrusted nature. In the present case, untrusted information sources can be used, with a user interacting with the untrusted device and forming the trusted source. For example, by inputting confirmation of configuration data transmitted directly from the tire pressure monitoring device to an untrusted device, the user can form a trusted source. The configuration data signal may be configured to be directly transmitted to a human from the tire pressure monitoring device, for example without first being transferred to a further intermediate device.

The configuration data signal may comprise a signal indicative of a reference pressure for a tire. A reference pressure of a tire is an important value for the correct operation of a tire pressure monitoring system which monitors whether the monitored tire pressure is with safe operating parameters. Confirmation of the configured reference tire pressure in a trusted way is important to verify the correct configuration, and hence it forms part of certification to ensure that a required DAL for the tire pressure monitoring device and/or a vehicle tire system comprising the tire monitoring device is met.

The configuration data signal may comprise a visual signal, and the visual signal may be transmitted using a visual indicator of the trusted tire pressure monitoring device. A visual signal is a relatively straightforward signal type, which can be easily received and understood by a human.

The visual indicator may comprise a light source, and the method then comprises selectively illuminating the light source to transmit the configuration data signal. The presence and absence of light can be easily received and understood by a human, and hence the configuration data signal may be relatively simple.

The light source may comprise a Light Emitting Diode (LED). The light source may be a multi-purpose light source, for example a light source configured to provide functionality in addition to transmitting the configuration data signal. This can reduce the cost and complexity of the tire pressure monitoring device. For example, the light source may also be configured to be selectively illuminated to display a health status of a tire or a tire system, such as whether a monitored tire pressure is acceptable or if maintenance is required.

The configuration data signal may comprise a number, and the selective illumination of the light source may comprise encoding the number into an illumination sequence representing individual digits of the number. For example, a first number of illuminations of the light source may represent a first digit of the number, a second number of illuminations of the light source may represent a second digit of the number, and so on. This provides a relatively simple signal which is easily received and understood by a human. The number of illuminations may directly correspond to the digit of the number, for example with one illumination representing the digit "1", and five illuminations representing the digit "5". Each illumination may be a distinct flash of the light source having an illumination period of at least 100 ms, at least 200 ms, at least 300 ms, at least 400 ms or at least 500 ms, so that it can be observed directly by a human.

In other examples, the visual indicator comprises a display of the tire pressure monitoring device. For example the display may be a matrix-display or segment-display on which configuration data can be displayed in readable characters to enable a user to read configuration data from the display.

The configuration data signal may comprise an audible signal, and the audible signal may be transmitted using a transducer of the trusted tire pressure monitoring device. The method may comprise selectively actuating the transducer to transmit the signal. For example the transducer can be caused to beep or a text-to-speech engine can convert configuration data into spoken information. Some examples may communicate the configuration data signal using both an audible signal and a visual signal.

The configuration data signal may comprise a number, and the selective actuation of the transducer may comprise encoding the number into an actuation representing individual digits of the number. For example, a first number of actuations or sounds of the transducer may represent a first digit of the number, a second number of actuations or sounds of the transducer may represent a second digit of the number, and so on. As discussed above this can be easily received and understood by a human.

The configuration data signal may comprise a start signal indicating a start of transmission, an end signal indicating an end of transmission, and an intermediate signal indicative of configuration data stored in the trusted tire pressure monitoring devices. This helps a human receiving the data configuration signal to interpret it, enabling the start and end, and when the configuration data is meant to be received, to be understood.

The start signal and the end signal may comprise a first type of signal, and the intermediate signal may comprise a second type of signal. This can further distinguish between the start, end and intermediate signals, and provide further clarity for a human as to which signal indicates configuration data. Various combinations of the first type and the second type of signal are possible. For example, the first type of signal may comprise an audible signal and the second type of signal may comprise a visual signal, or vice versa. Alternatively, or additionally, the first type of signal may comprise a first type of visual signal, such as a first colour of light, and the second type of signal may comprise a second type of visual signal, such as a second colour light different to the first colour light. This can provide a straightforward way to distinguish between the start/end signals and the intermediate signal.

The configuration data signal may comprise a plurality of sub-signals, each sub-signal comprising a start signal indicating a start of transmission of the sub-signal, an end signal indicating an end of transmission of the sub-signal, and an intermediate signal indicative of at least a portion of configuration data stored in the tire pressure monitoring device. This enables the data configuration signal to be split into smaller pieces, making it more easily understood by a human. Each intermediate signal may be indicative of a portion of configuration data stored in the tire pressure monitoring device. For example, each intermediate signal may be indicative of a digit of a reference pressure stored in memory of the tire pressure monitoring device.

An end signal of a first sub-signal may comprise a start signal of a second sequential sub-signal. For example, a same sub-signal signal may indicate the end of one sub-signal and the start of another sub-signal. This can reduce the time required to transmit the configuration data signal.

In some examples, each sub-signal is confirmed as being received and understood by a human before a next sequential sub-signal is transmitted. This improves the reliability of the verification of the configuration data because a human receiving the data does not have to rely on their memory to the same extent. Each sub-signal may be transmitted in response to verification of a previous sub-signal by a user.

The method may comprise transmitting an alert indicating that transmission of the configuration data signal is about to begin. This may enable a human to know when a signal is to be transmitted for easier understanding and subsequent verification of the data configuration signal. For example, this may enable the configuration data signal to be received, understood, and verified in a stepwise manner, which may be clear to a human. The alert can be a different signal from the start signal discussed above and can be additional or alternative to the start signal. For example, the alert can be a first type of signal, such as an audible signal, and the start signal can be a second type of signal, such as a visual signal.

The method may comprise verifying, by a human, that the configuration data of the tire pressure monitoring device matches an expected configuration data. This removes the need for another trusted device to perform verification, because the human may be regarded as a trusted source. Verification by a human that the configuration data of the trusted tire pressure monitoring device matches expected configuration data may take place using an untrusted device, for example by an untrusted intermediate device, such as a smartphone, tablet or other computing device, which provides the user with a prompt of what configuration data is expected. Although the intermediate device is untrusted, if it is faulty or has malicious software installed then the end result will be that the configuration is not verified, so safety is provided. This may reduce cost associated with the verification procedure compared to a process that requires an intermediate, independent, trusted device. It can also more provide more flexibility; because the intermediate device is untrusted its functionality can be provided by an application or app running on different hardware platforms without all those platforms having to be certified.

The request to confirm configuration data may be received at the tire pressure monitoring device via a short-range communication protocol. This provides security benefits as physical proximity is required and can also provide an operational benefit if the range is short enough that is generally received by a single device to prevent a request from being picked-up by a wrong tire pressure monitoring device. The request may be submitted via a communication protocol with a range of less than 5 m, less than 2 m, less than 1 m, less than 50 cm, less than 30 cm or less than 15 cm. Suitable communication protocols include Near Field Communication (NFC). In some examples, no identifier is included in the request to confirm configuration data, with a short range of transmission and physical proximity indicating the device to respond. Alternatively, the request may include a unique identifier of a device. The unique identifier may be input by a user by reading a marking on the tire pressure monitoring device or determined by data provided on or by the tire pressure monitoring device, such as by scanning or a QR code of the tire pressure monitoring device, NFC, or Radio Frequency Identification (RFID) tag interrogation.

The method may comprise transmitting the configuration data signal to a further trusted tire pressure monitoring device, and subsequently transmitting the configuration data signal from the further trusted tire pressure monitoring device to be received and understood by a human. This may allow for configuration of one or more tire pressure monitoring devices to be transmitted from a single tire pressure monitoring device, which can simplify a procedure where the configuration data of several tire pressure monitoring devices needs to be verified. For example a need to move between devices can be reduced and/or a tire pressure monitoring device which is positioned so that it difficult for a human to receive the configuration data signal can be relayed by another of the devices. All the tire pressure monitoring devices are trusted, so another tire pressure monitoring device can be a trusted intermediary. This does not significantly increase the cost or complexity of the system as a whole because no additional trusted devices are required.

For example, the method may comprise, at a first tire pressure monitoring device, receiving a request for configuration data of a second tire pressure monitoring device; transmitting the request from the first tire pressure monitoring device to the second tire pressure monitoring device; transmitting, from the second tire pressure monitoring device to the first tire pressure monitoring device, a configuration data signal indicative of configuration data stored in the second tire pressure monitoring device; and transmitting, from the second tire pressure monitoring device to a human, the configuration data signal indicative of configuration data stored in the second tire pressure monitoring device.

A second aspect of the present invention provides a data carrier comprising machine readable instructions, which when executed by a processor of a tire pressure monitoring device, cause the tire pressure monitoring device to perform the method according to the first aspect of the present invention. The machine readable instructions may also cause the tire pressure monitoring device to execute any of the optional features also described. The data carrier may be a non-transitory computer readable medium.

A third aspect of the present invention provides a tire pressure monitoring device configured to perform the method of the first aspect of the present invention.

A fourth aspect of the present invention provides a tire pressure monitoring device comprising a memory for storing configuration data, a light source, and a processor configured to selectively illuminate the light source to transmit a signal indicative of configuration data stored in the memory. For example, any of the methods discussed above to communicate a configuration data signal with a light source can be used.

The signal indicative of configuration data may comprise a signal indicative of a reference tire pressure stored in the memory. The tire pressure monitoring device may be configured to communicate with a further tire pressure monitoring device, for example to send a further configuration data request to the further tire pressure monitoring device and/or to receive a further configuration data signal indicative of further configuration data stored in memory of the further tire pressure monitoring device. The tire pressure monitoring device and the further tire pressure monitoring device may comprise respective unique identifiers, for example unique identifiers which are presented in response to appropriate interrogation.

A fifth aspect of the present invention provides an aircraft comprising a tire pressure monitoring device according to the third or fourth aspect of the present invention.

A sixth aspect of the present invention provides a method of communicating configuration data from a network of tire pressure monitoring devices, the method comprising at a first tire pressure monitoring device, receiving a request for configuration data of a second tire pressure monitoring device, transmitting the request from the first tire pressure monitoring device to the second tire pressure monitoring device, transmitting from the second tire pressure monitoring device to the first tire pressure monitoring device a configuration data signal indicative of configuration data stored in the second tire pressure monitoring device, and transmitting from the first tire pressure monitoring device the configuration data signal indicative of configuration data stored in the second tire pressure monitoring device.

Features of aspects of the present invention may be equally applied to other aspects of the present invention, where appropriate.

BRIEF DESCRIPTION OF THE DRAWINGS

Embodiments of the invention will now be described, by way of example only, with reference to the accompanying drawings, in which.

DETAILED DESCRIPTION

Figure 1:
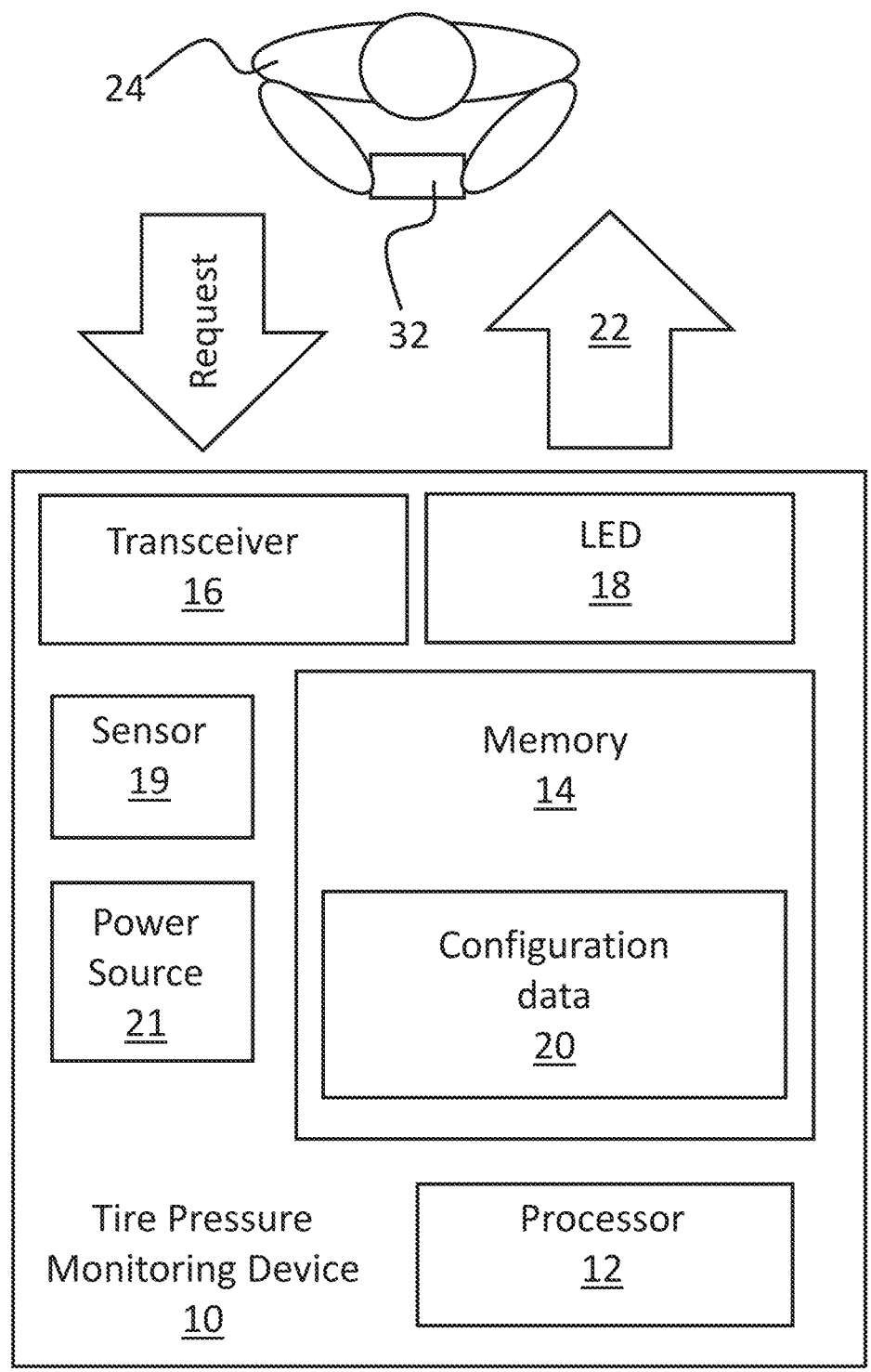
FIG. 1 is a schematic view of a tire pressure monitoring device according to an example.

A tire pressure monitoring device 10 according to an example is shown schematically in FIG. 1. The tire pressure monitoring device 10 comprises a processor 12, a memory 14, a transceiver 16, a visual indicator or display which is an LED 18 in this example, a sensor 19 and a power source 21.

The processor 12 may be any suitable processor including single and multi-core processors, an Application Specific Integrated Circuit (ASIC) or like. The processor 12 is communicatively coupled to the transceiver 16, the LED 18, the memory 20 and the sensor 21.

Memory 14 is a flash memory that stores configuration data 20 and also computer readable instructions for execution by the processor 12 in operation, although it will be appreciated that other types of memory may be used. The configuration data 20 can therefore be updated as required with configuration data. A reference tire pressure is stored in the configuration data 20. Additional data can also be stored in the configuration data 20, for example an aircraft identifier (such as an aircraft Tail identifier) and a wheel position.

Transceiver 16 is an appropriate transceiver capable of receiving a request to confirm the configuration data 20. In this embodiment, the transceiver 16 comprises a short-range radio signal transceiver operating according to the NFC protocol. It will be appreciated, however, that other communication protocols may be used, including, for example, a Bluetooth low energy (BLE) communication protocol. When the transceiver 16 receives a request to confirm the configuration data 20, the processor 12 encodes the configuration data 20 stored in the memory 14 of the tire pressure monitoring device 10, and transmits a signal 22 indicative of the configuration data 20 via the LED 18 to a user 24 observing the tire pressure monitoring device 10. Here the LED 18 is a two-colour LED which is capable of displaying both red and green coloured light. Other examples may use a different number of colours of light than two and/or use other colours than red and green. In examples herein, the user 24 is a human.

Figure 2:
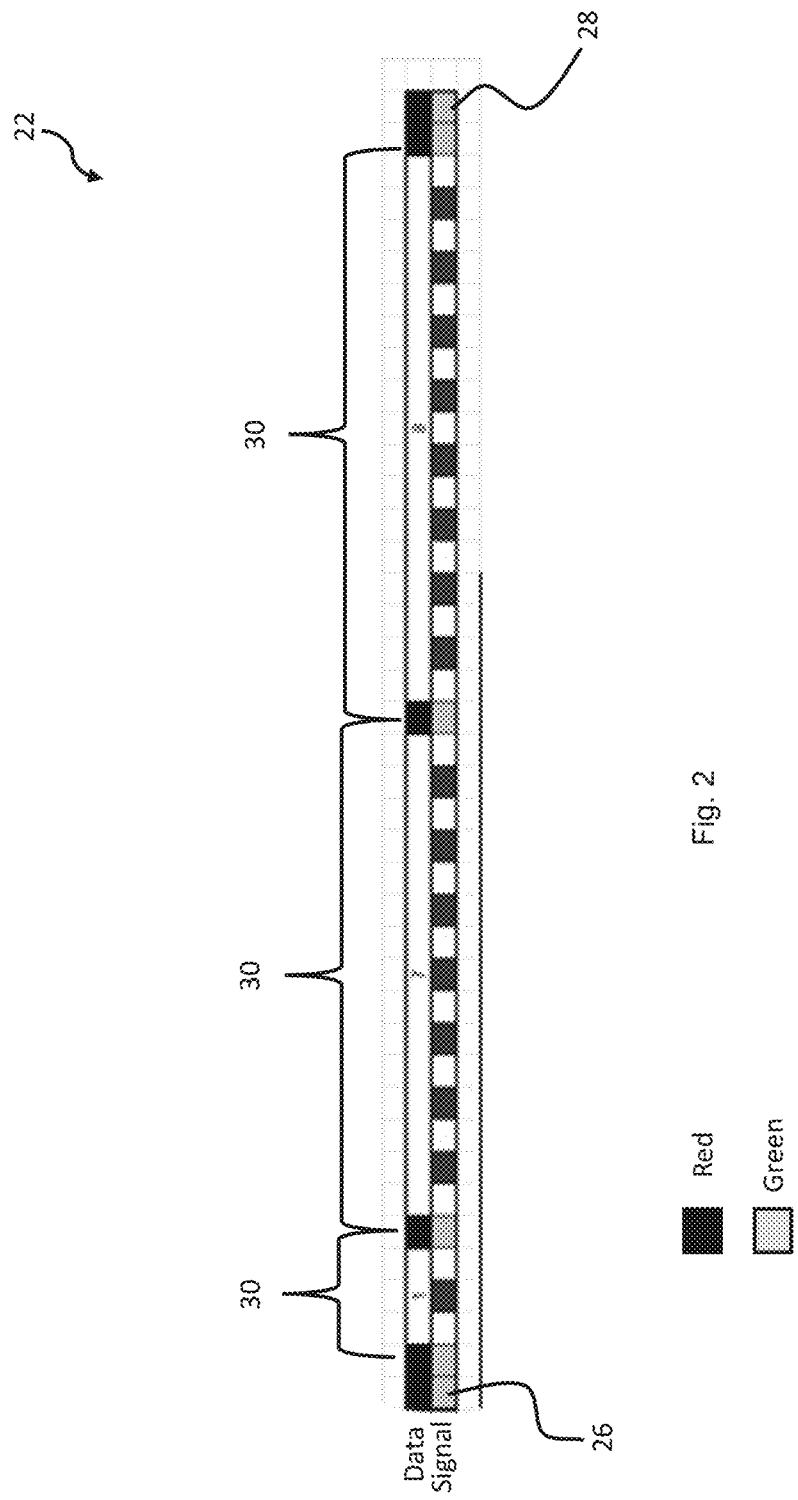
FIG. 2 is a schematic illustration of a first signal indicative of configuration data of a tire pressure monitoring device.

An example of the signal 22 is shown schematically in FIG. 2, where the signal encodes a reference tire pressure stored in configuration data 20 of the tire pressure monitoring device 10. Checking a reference tire pressure has been correctly stored in a tire pressure monitoring device is an important part of setup to confirm correct operation after configuration. It is possible that the configuration data is corrupted and stores an incorrect value, or an incorrect value may have been loaded in error or by a bad actor. The consequences of an incorrect reference tire pressure level in use may be severe, for example making a tire blow-out more likely if the tire operated at too low a pressure.

As shown in FIG. 2, the reference tire pressure of the tire pressure monitoring device 10 is 178 PSI (1.23 MPa). The signal 22 as a whole has a start signal 26 in the form of a green flash of light from the LED 18, and an end signal 28 in the form of another green flash of light from the LED. The signal 22 is split into a number of sequential sub-signals 30, with each sub-signal 30 being representative of a digit of the reference tire pressure. Each sub-signal 30 has a start signal in the form of a green flash of light from the LED 18, an end signal in the form of another green flash of light from the LED 18, and an intermediate signal in the form of a flash/a number of red flashes of light from the LED 18.

As shown in FIG. 2, the start of the first sub-signal 30 is coincident with the start signal 26 of the overall signal 22, and the end of the last sub-signal 30 is coincident with the end signal 28 of the overall signal 22, such that the start 26 and end 28 signals resemble prolonged flashes of the LED 18. Furthermore, a flash of the LED to indicate the end of the first sub-signal 30 also functions as a start signal of the second sub-signal.

In the signal 22, the intermediate signals of each subsignal 30 encode and are indicative of the reference tire pressure. For example, in the first sub-signal 30, there is one flash of red light from the LED 18, indicating that the first digit of the reference tire pressure is the number "1". In the second sub-signal 30, there are seven flashes of red light from the LED 18, indicating that the second digit of the reference tire pressure is the number "7". In the third sub-signal 30, there are eight flashes of red light from the LED 18, indicating that the third digit of the reference tire pressure is the number "8". Thus the LED 18 can be used to output the signal 22 to the user 24, with the signal 22 being in a manner that is easily receivable and understandable by the user 24. The duration of each flash can be chosen depending on the length of the overall sequence and the length of flash needed to be clear to the user 24, and in the example of FIG. 2 each flash is 0.5 s long. In other examples, the colour of the flashes can be different, for example with a different colour of light being used for each digit of the reference tire pressure so that a first colour indicates "units", a second colour indicates "tens" and a third colour indicates "hundreds".

Once the signal 22 is received by the user 24, the user 24 may take appropriate action to confirm that the reference tire pressure stored in the memory 14 is correct, or may take appropriate remedial action if the reference tire pressure is incorrect. In some examples, the user 24 uses an untrusted device 32, for example a mobile phone or tablet computer running an application, to verify the configuration data 20.

As the user 24 can be taken to be a trusted source, and the tire pressure monitoring device 10 is itself a trusted source, the untrusted device 32 can be used to input the user's verification of the configuration data 20. For example, the untrusted device 32 can display a prompt with an expected reference pressure. The verification can be trusted because it occurs between the user 24 (who is trusted) and tire pressure monitoring device 10 (which is trusted because of its certification to a particular DAL).

Whilst the tire pressure monitoring device 10 is depicted in FIG. 1 as comprising an LED 18, and the signal 22 comprises flashes of the LED 18, it will be appreciated that in another embodiment the tire pressure monitoring device 10 may comprise a transducer in the form of a beeper or speaker, and that that the signal 22 may instead comprise audible noises instead of flashes of light.

Figure 3:
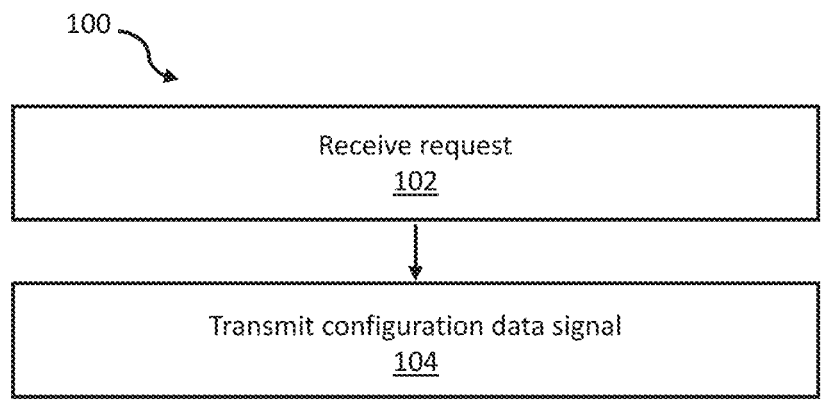
FIG. 3 is a schematic view illustrating a first example method of communicating configuration data of a tire pressure monitoring device.

A method 100 of operating the tire pressure monitoring device 10 is shown schematically in FIG. 3. The method 100 comprises receiving 102 a request to confirm the configuration data 20 of the tire pressure monitoring device 10 at the transceiver 16. Responsive to the request, a configuration data signal 22 encoding the configuration data 20 is transmitted 104 by the LED 18.

Figure 4:
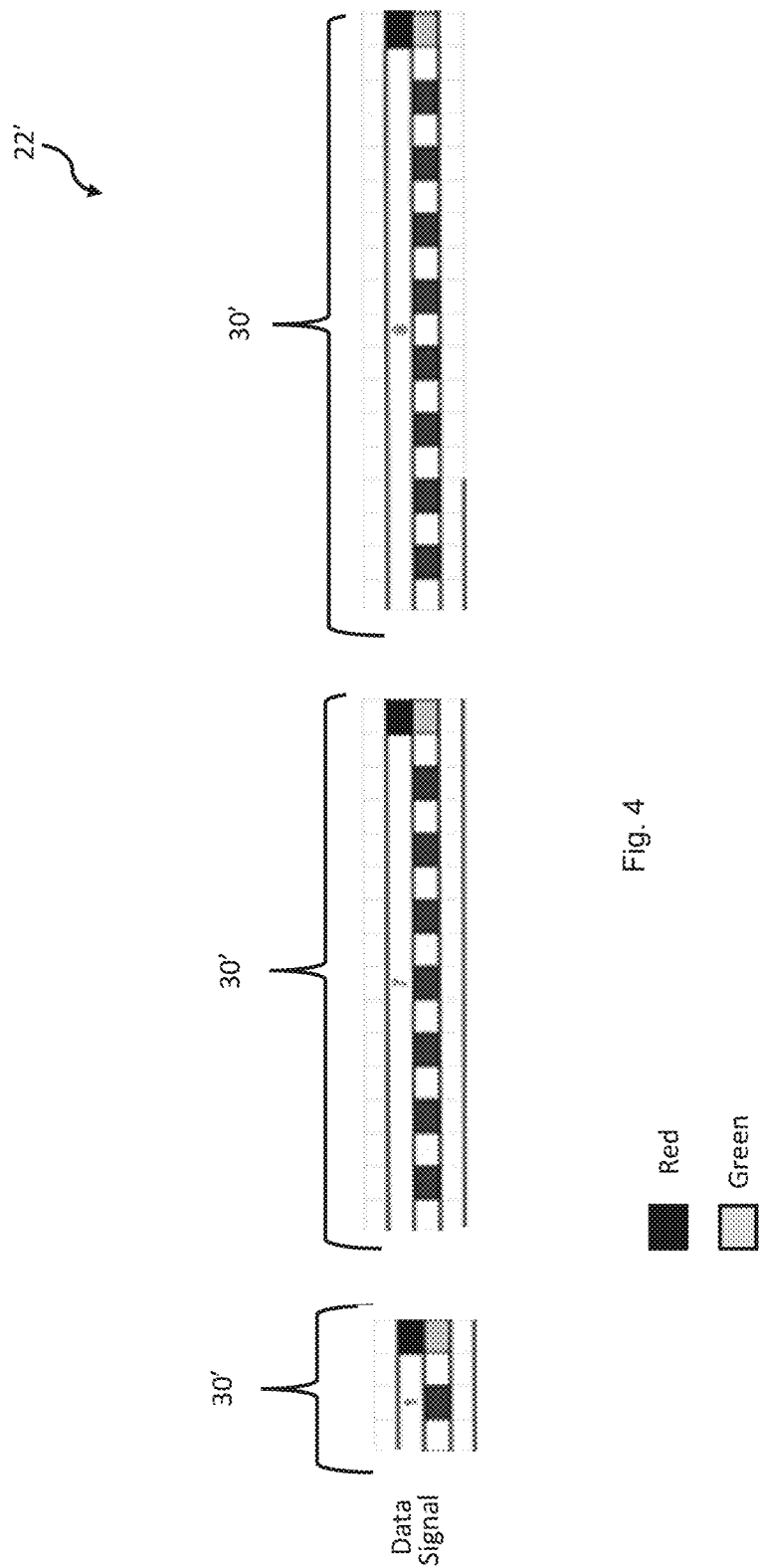
FIG. 4 is a schematic illustration of a second signal indicative of configuration data of a tire pressure monitoring device.

In another example, a signal 22' takes a different form, as illustrated schematically in FIG. 4. In this instance, subsignals 30' are discrete signals separate from one another. This allow the signal 22' to be split such that each sub-signal 30' is easily recognisable and verifiable by a user. In this example, an untrusted device 32 may communicate with a tire pressure monitoring device 10, and the tire pressure monitoring device 10 may cause a sequence of discrete sub-signals 30' to be provided in response to instructions received over the receiver from the untrusted device.

Figure 5A:
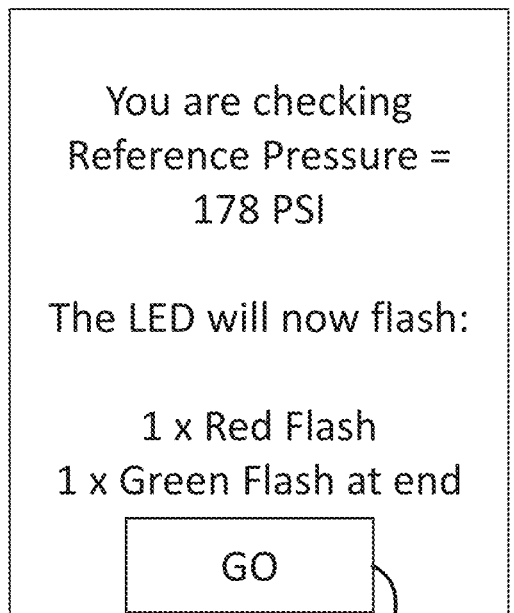
FIGS. 5A to 5G are schematic views illustrating a display of an untrusted device used to verify the signal of FIG. 4.
Figure 5B:
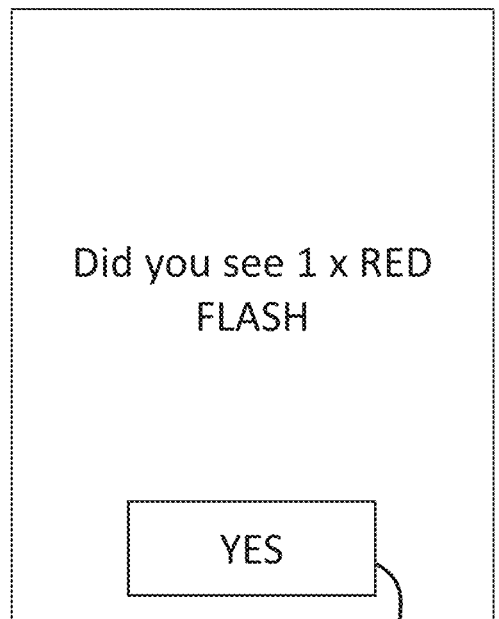

For example, in response to a request from the user 24, submitted via the untrusted device 32, to check or determine the configuration data stored in a tire pressure monitoring device 10, a first message indicating what form a first sub-signal 30' will take is displayed on the untrusted device 32. This first message is shown schematically in FIG. 5A. It provides data of what the reference pressure is expected to be, in this case 178 PSI (equivalent to 1.23 MPa, or 12.3 BAR), and of what signal is expected to be provided by the tire pressure monitoring device 10. In this case the signal is one red flash, indicating the digit 1, and one green flash, indicating the end of a sub-signal for that digit. The user 24 interacts with a user interface element 52 on the untrusted device 32 to cause the first sub-signal 30' to be transmitted by the LED 18. In this case, the user interface element is a button displayed on a touch screen of the untrusted device 32 which displays the text "go". In response to activation of the user interface element 52, such as by a tap, the untrusted device 32 transmits a signal to the tire pressure monitoring device 10 to cause it to transmit or communicate the first sub-signal 30'. Meanwhile, the untrusted device 32 displays a first verification message, allowing the user 24 to indicate that the first sub-signal 30' has been received and understood by a user interface element 54, as shown schematically in FIG. 5B. A message is also provided to remind the user what they should have observed, in this case one red flash.

Figure 5C:
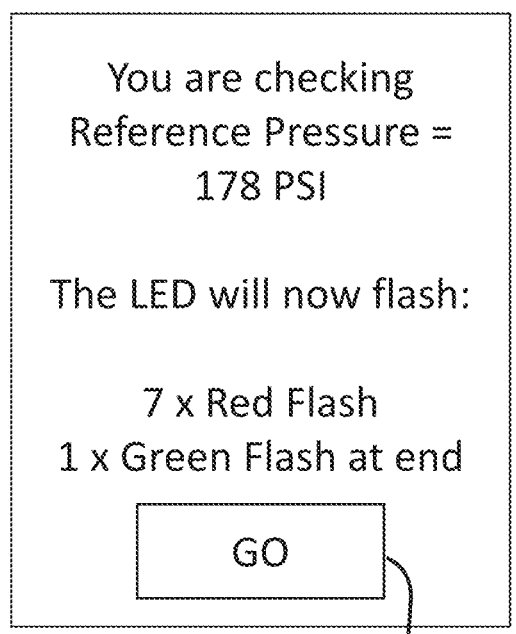
Figure 5D:
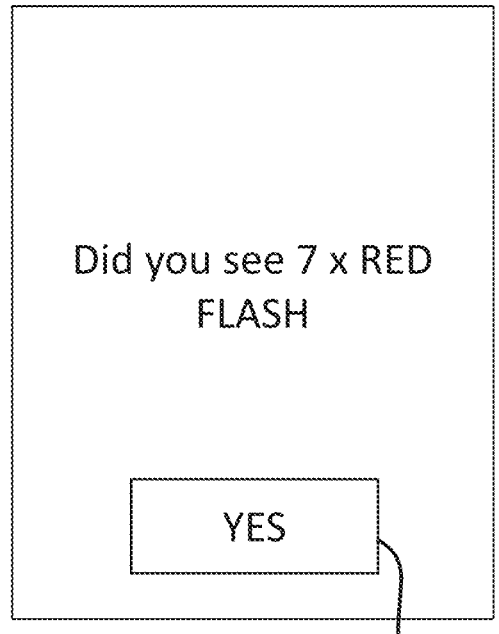

When the user interface element 54 is activated, such as by a tap on a touch screen of the untrusted device 32, a second message indicating what form a second sub-signal 30' will take is displayed on the untrusted device, as shown schematically in FIG. 5C. Again this states the reference pressure and what the next signal is expected to be, in this case seven red flashes for the digit 7 followed by a green flash to indicate the end of the sub-signal. A user interface element 56 is provided which, when selected by the user, causes the tire pressure monitoring device 10 to transmit or communicate the second sub-signal 30', in the same way as described above for FIG. 5A. Once the second sub-signal 30' has been transmitted, a second verification message is displayed on the untrusted device 32, shown schematically in FIG. 5D. A user can confirm the second sub-signal 30' has been observed by interacting with a user interface element 58, in the same as described above for FIG. 5B.

Figures 5E, 5F:
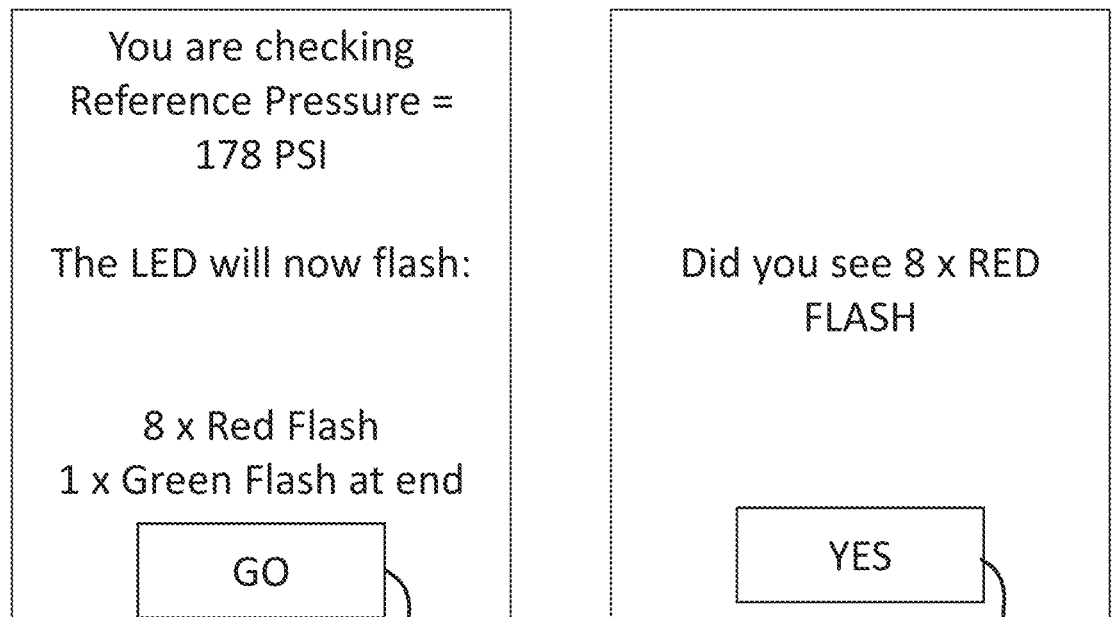

Next, a third message indicating what form a third sub-signal 30' will take is displayed on the untrusted device 32, as shown schematically in FIG. 5E. Again this includes the reference pressure and an indication that the third sub-signal 30' will comprise eight red flashes, corresponding to the digit 8. As discussed above with reference to FIG. 5A, the user interacts with a user interface element 60 that causes the third sub-signal 30' to be transmitted or communicated by the LED 18. Once the third sub-signal 30' has been transmitted, a third verification message 62 is displayed on the untrusted device, allowing the user to indicate that the third sub-signal 30' has been received and understood, as shown schematically in FIG. 5F.

Figure 5G:
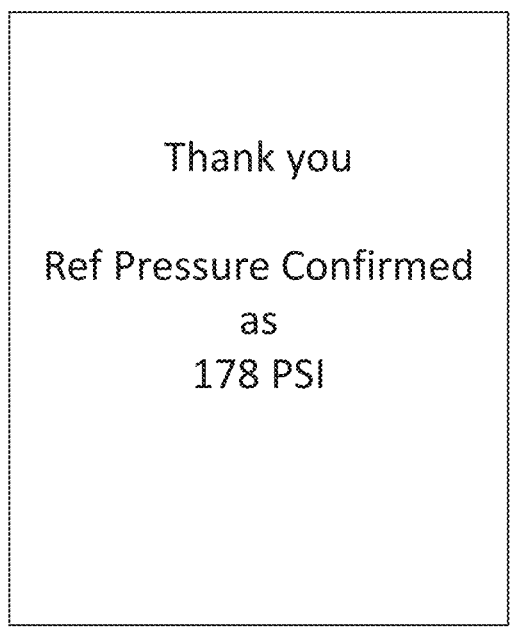

Finally a confirmation message is displayed on the untrusted device 32 once all sub-signals 30' have been received, as shown schematically in FIG. 5G. Although described here with reference to three sub-signals, it will be recognised that the number of sub-signals may vary depending on the configuration data requested. Other configuration data than pressure may be indicated and alphabetical data as well as numerical data can be communicated. Other encoding schemes can also be used, for example Morse code, but a direct correlation between a numerical value and the number of flashes has the benefit of requiring no specific user knowledge and potentially more reliable to recognise.

As discussed above with reference to FIGS. 5A to 5G, only a single user interface element is displayed to allow the user to provide positive confirmation. A timer may be associated with each screen after which a negative result may be assumed and the process terminates without confirmation. Alternatively a specific negative option, to cancel the process or to indicate that the observed sequence did not match that which was expected, can be included in the user interface to allow a user to indicate that the data has not been confirmed.

This process allows an untrusted device to guide a user through the process because if the untrusted device attempts to mislead the user as to the configured pressure, the user, who is trusted, will notice that the signal from the tyre pressure monitoring device does not match what is expected. Similarly, the use of a simple encoding where the number of flashes matches the digit, a user can identify potential false guidance on the untrusted device.

Figure 6:
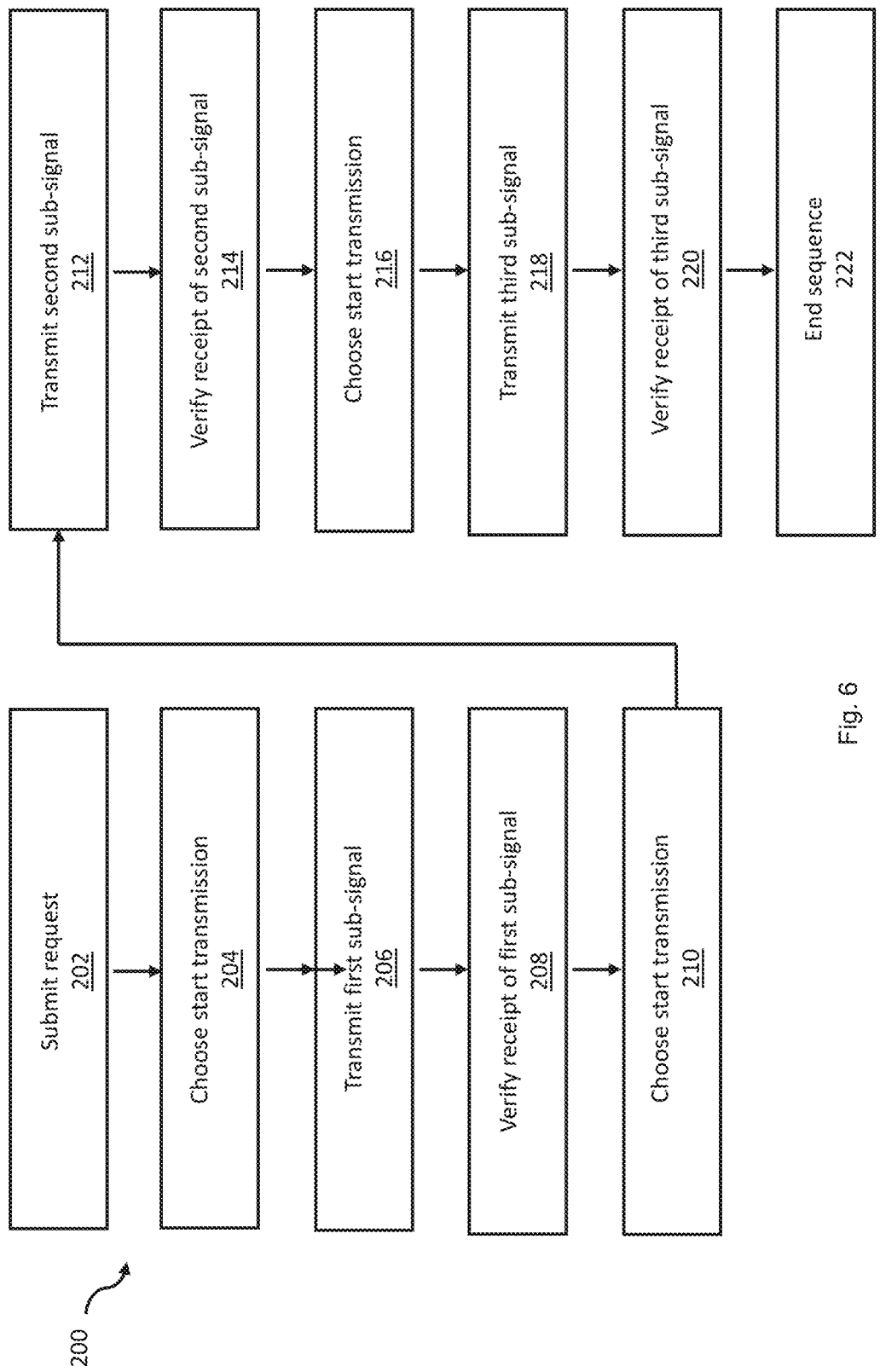
FIG. 6 is a schematic view illustrating a second example method of communicating configuration data of a tire pressure monitoring device.

A further example method 200 of operating a system comprising the tire pressure monitoring device 10 and the untrusted device 32 is shown schematically in FIG. 6, with the signal 22' taking the form depicted in FIG. 4.

The method 200 comprises submitting, at block 202, a request for configuration data from the tire pressure monitoring device using the untrusted device 32, by interacting with the user interface of the untrusted device 32. In response to the request, a start transmission option is chosen, at block 204, by interacting with the user interface of the untrusted device. The first sub-signal 30' is transmitted at block 206, and a user is required to verify at block 208 that the first sub-signal 30' has been correctly received by interacting with the user interface of the untrusted device 32. A start transmission option is chosen 210 for the second sub-signal 30', again interaction with a user interface of the untrusted device 32. The second sub-signal 30' is transmitted at block 212, and a user is required to verify at block 214 that the second sub-signal 30' has been correctly received by interacting with the user interface of the untrusted device 32. A start transmission option is then chosen at block 216 for the third sub-signal 30', again using a user interface of the untrusted device 32. The third sub-signal 30' is transmitted at block 218, and a user is required to verify at block 220 that the third sub-signal 30' has been correctly received, using the user interface of the untrusted device 32. The transmission sequence is then ended 222.

In such a manner, the method 200 may transmit the sub-signals 30' in a stepwise manner, with verification of each sub-signal 30' being required before a next sub-signal in the sequence is transmitted. This can improve clarity of the signal for the user, and provide for easier verification of the configuration data in use while also reducing user error because there is less reliance on a user's memory.

Figure 7:
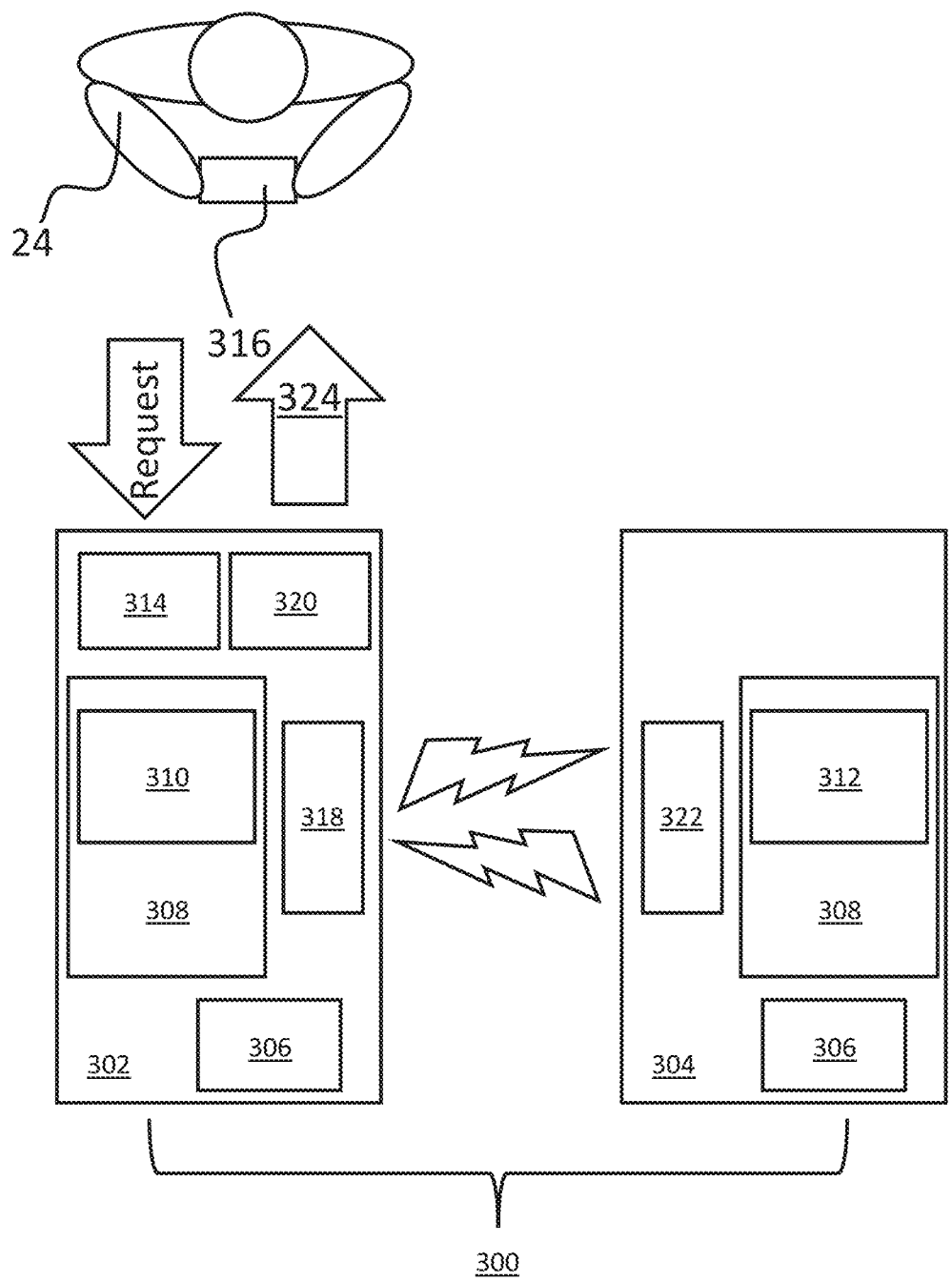
FIG. 7 is a schematic view of a network of tire pressure monitoring devices according to an example.

An example of a network 300 of a first 302 and a second 304 tire pressure monitoring devices is shown schematically in FIG. 7. The first 302 and second 304 tire pressure monitoring devices have generally the same structure as the tire pressure monitoring device 10 of FIG. 1, but with differences that will now be described.

Each of the first 302 and second 304 tire pressure monitoring devices has a processor 306, and a memory 308. The processor 306 may be any conventional processor, and the memory 308 stores respective configuration data 310,312. The first tire pressure monitoring device 302 has a receiver 314 for communicating with an untrusted device 316, a transceiver 318 for communicating with the second tire pressure monitoring device 304, and a visual indicator in the form of an LED 320. The LED 320 in this example is an LED which is capable of displaying both red and green coloured light as discussed above with reference to FIG. 1, other examples may use other types of visual indicator and other colours of light. The second tire pressure monitoring device 304 has a transceiver 322 for communicating with the transceiver 318 of the first tire pressure monitoring device 302. Two devices are shown here for clarity, it will be appreciated that there will typically be more than two devices, with each tire having an associated tire pressure monitoring device.

Figure 8:
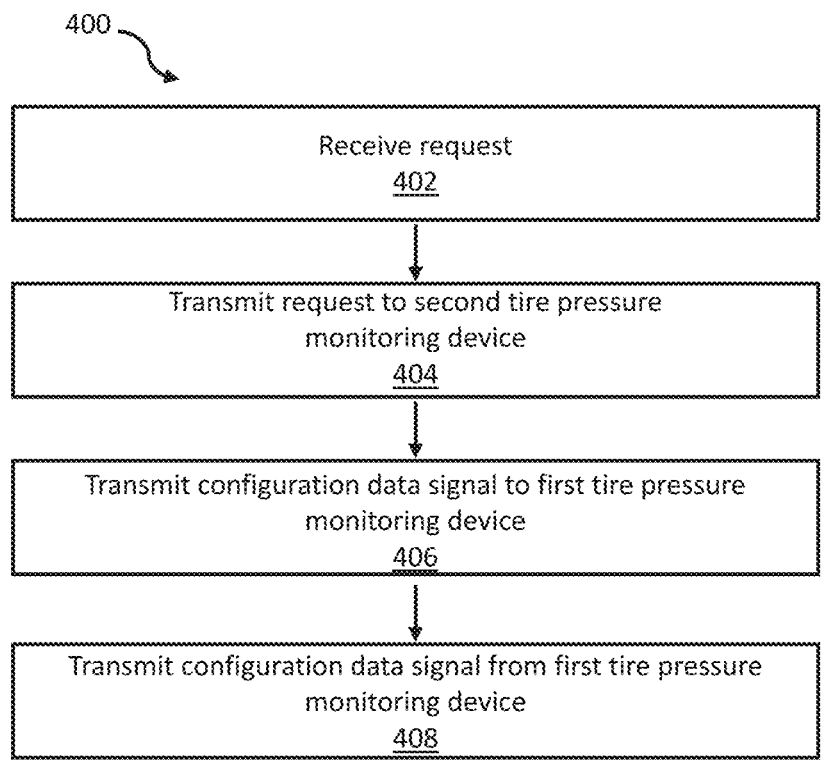
FIG. 8 is a schematic view illustrating a method of operating the network of FIG. 7.

A method 400 of operating the network 300 is shown schematically in FIG. 8. The method 400 comprises receiving, at block 402, at the receiver 314 of the first tire pressure monitoring device 302, a request to confirm the configuration data 312 stored in the memory 308 of the second tire pressure monitoring device 304. The first tire pressure monitoring device 302 uses its transceiver 318 to transmit, at block 404, the request to the transceiver 322 of the second tire pressure monitoring device 304. In response to receipt of the request, the processor 306 of the second tire pressure monitoring device 304 encodes the configuration data 312 stored in the memory 308 of the second tire pressure monitoring device 304, and the processor 306 uses the transceiver 322 of the second tire pressure monitoring device 304 to transmit, at block 406, a signal representative of the configuration data 312 to the transceiver 318 of the first tire pressure monitoring device 302. The LED 320 of the first tire pressure monitoring device 302 then transmits 408 a signal 324 representative of the configuration data 312 stored in the memory 308 of the second tire pressure monitoring device 304 in manner such that the signal 324 can be received and understood by a user 24.

Thus the configuration data 312 stored in the memory 308 of the second tire pressure monitoring device 304 can be requested at and subsequently displayed by the first tire pressure monitoring device 302. This can provide for easier and simpler operation in use, as a user can request configuration data from multiple tire pressure monitoring devices at a single tire pressure monitoring device. This can also reduce the time taken to obtain configuration data, as a user does not need to move from device to device in order to request and obtain configuration data.

In some examples, the signal communicated to the user may include additional elements to indicate which tire pressure monitoring device the configuration data applies to, for example by encoding a wheel position before or after the reference pressure. For example, where the second tire pressure monitoring device 304 is at a wheel allocated number "3", the LED 320 of the first tire pressure monitoring device 302 may flash three times to indicate that it is the configuration data of the tire pressure monitoring device of wheel "3" that is transmitted as the signal 324.

Figure 9:
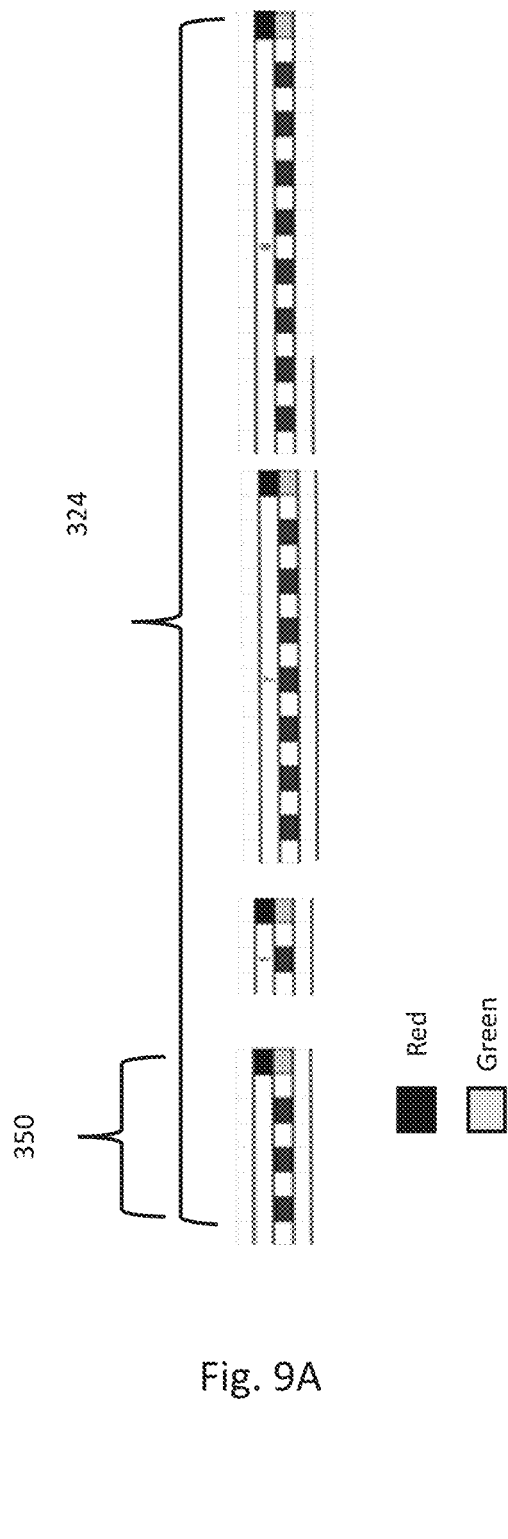
FIG. 9A is schematic illustration of a third signal indicative of configuration data of a tire pressure monitoring device.
FIGS. 9B and 9C are schematic views illustrating a display of an untrusted device used to verify a location indication in the signal of FIG. 9A.

FIG. 9A depicts an example of a signal 324 including a location indication 350 of a tire pressure monitoring device. The location indication is an example of additional information as described above. An associated indication message and confirmation message to be displayed on the untrusted device 316 are depicted in FIGS. 9B and 9C, respectively. The indication message of FIG. 9B is displayed as a message which indicates the number of red flashes corresponding to the tire pressure monitoring device location being checked, followed by a green flash to indicate end of transmission expected be observed by the user on the LED 320. In the example of FIG. 9B, the wheel location is "3" and the message indicates that three red flashes for the location indication 350 are expected. In response to user interaction with a user interface element 352 on the untrusted device 316, the location indication 350 is communicated or transmitted by causing the LED to provide three red flashes followed by a green flash.

Subsequent to communicating the location indication 350, the confirmation message of FIG. 9C is displayed by the untrusted device 316 which asks the user 24 to confirm that they have correctly received the location indication 350. Confirmation is provided via interaction with a user interface element 354 on the untrusted device 316. Once confirmation has taken place, an initial message similar to that of FIG. 5A may be displayed on the untrusted device 316, and the remainder of the signal 324 may take a form similar to that of the signal 22' of FIG. 4, with the user continuing to work through the method of FIG. 6 to confirm the configuration data.

In some examples, a unique identifier may be used to identify one or both of the first 302 and second 304 tire pressure monitoring devices and used to indicate which device(s) should communicate stored configuration information. The unique identifier can be determined by an untrusted device or entered manually into the untrusted device. For example, the unique identifier can be determined by the untrusted device by: Near Field Communication (NFC) or Radio Frequency Identification (RFID) interrogation of the tire pressure monitoring device; by reading a printed indication of the serial number, such as a barcode (one- or two-dimensional) using a camera, reading characters of a serial number using Optical Character Recognition (OCR) using a camera or the like. Manual entry may involve entering the unique identifier as printed on a device or instead providing an aircraft tail identifier and an associated wheel position for which it is desired to confirm the configuration data.

Figure 10:
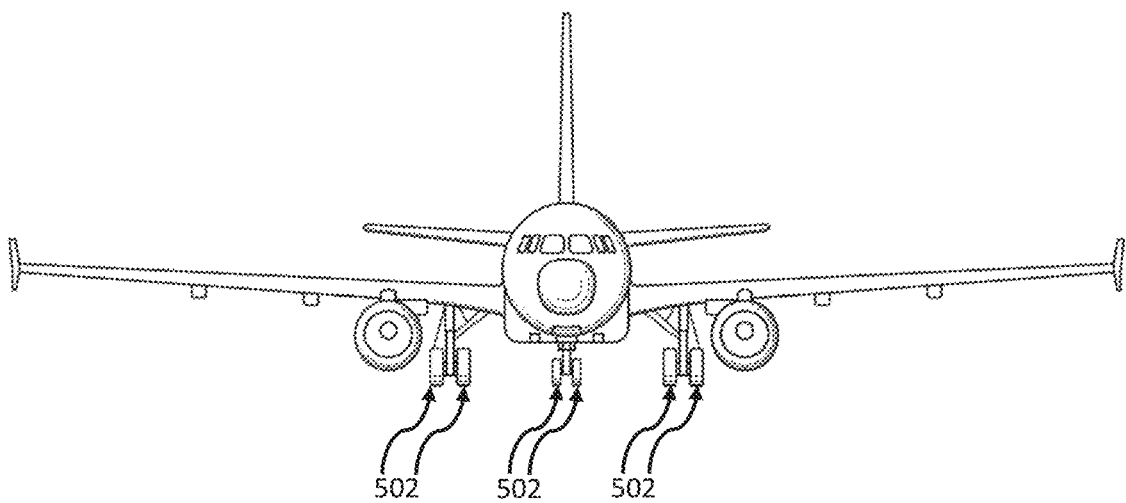
FIG. 10 is a schematic view illustrating an aircraft comprising the tire pressure monitoring device of FIG. 1 or the network of FIG. 7.

The tire pressure monitoring device described above is useful for confirming safety critical configuration data with a high degree of reliability assurance. It is particularly suited for use in aircraft. An aircraft 500 comprising a respective tire pressure monitoring device 10 of FIG. 1 for each tire 502 is shown schematically in FIG. 10. The tire pressure monitoring devices can form a network as discussed above with reference to FIG. 7 or operate independently.

It is to be noted that the term "or" as used herein is to be interpreted to mean "and/or", unless expressly stated otherwise.

The above embodiments are to be understood as illustrative examples of the invention. Further embodiments of the invention are envisaged. In some embodiments, configuration data other than tire reference pressure may be communicated. For example, a position identifier, or an installation date may be communicated. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of communicating configuration data of a tire pressure monitoring device configured to be affixed to a wheel in use, the method comprising, at the tire pressure monitoring device:
   receiving a request to confirm configuration data;
   responsive to receipt of the request to confirm configuration data, transmitting a configuration data signal which encodes the configuration data;
   wherein the configuration data signal is configured to be received and understood by a human;
   wherein the configuration data signal comprises a visual signal, and the visual signal is transmitted using a visual indicator of the tire pressure monitoring device;
   wherein the visual indicator comprises a light source, and the method comprises selectively illuminating the light source to transmit the configuration data signal; and,
   wherein the configuration data signal comprises a number, and the selective illumination of the light source comprises encoding the number into an illumination sequence representing individual digits of the number.

2. A method as claimed in claim 1, wherein the configuration data signal comprises a signal indicative of a reference pressure for a tire.

3. A method as claimed in claim 1, wherein the configuration data signal comprises an audible signal, and the audible signal is transmitted using the tire pressure monitoring device.

4. A method as claimed in claim 1, wherein the configuration data signal comprises a start signal indicating a start of transmission, an end signal indicating an end of transmission, and an intermediate signal indicative of configuration data stored in the tire pressure monitoring device.

5. A method as claimed in claim 4, wherein the start signal and the end signal comprise a first type of signal, and the intermediate signal comprises a second type of signal.

6. A method as claimed in claim 5, wherein the first type of signal comprises a first colour light and the second type of signal comprises a second colour light different to the first colour light.

7. A method as claimed in claim 1, wherein the configuration data signal comprises a plurality of sub-signals, each sub-signal comprising a start signal indicating a start of transmission of the sub-signal, an end signal indicating an end of transmission of the sub-signal, and an intermediate signal indicative of at least a portion of configuration data stored in the tire pressure monitoring device.

8. A method as claimed in claim 7, wherein each sub-signal is confirmed as being received and understood by a human before a next sequential sub-signal is transmitted.

9. A method as claimed in claim 1, wherein the method comprises transmitting an alert indicating that transmission of the configuration data signal is about to begin.

10. A method as claimed in claim 1, wherein the method comprises verifying, by a human, that the configuration data of the tire pressure monitoring device matches expected configuration data, and verification by a human that the configuration data of the tire pressure monitoring device matches expected configuration data takes place using an untrusted device.

11. A method as claimed in claim 1, wherein a request to confirm configuration data is submitted via a short-range communication protocol.

12. A method as claimed in claim 1, wherein the method comprises transmitting the configuration data signal to a further tire pressure monitoring device, and subsequently transmitting the configuration data signal from the further tire pressure monitoring device to be received and understood by a human.

13. A tire pressure monitoring device comprising a memory for storing configuration data, a visual indicator comprising a light source, and a processor configured to control the light source to transmit a signal indicative of configuration data stored in the memory, wherein the tire pressure monitoring device is configured to be affixed to a wheel and is configured to perform a method of communicating configuration data of the tire pressure monitoring device, wherein the method comprises:
  receiving a request to confirm configuration data;
  responsive to receipt of the request to confirm configuration data, transmitting a configuration data signal which encodes the configuration data;
  wherein the configuration data signal is configured to be received and understood by a human;
  wherein the configuration data signal comprises a visual signal, and the visual signal is transmitted using the visual indicator of the tire pressure monitoring device;
  wherein the method comprises selectively illuminating the light source to transmit the configuration data signal; and,
  wherein the configuration data signal comprises a number, and the selective illumination of the light source comprises encoding the number into an illumination sequence representing individual digits of the number.

14. A tire pressure monitoring device as claimed in claim 13, wherein the signal indicative of configuration data comprises a signal indicative of a reference tire pressure stored in the memory.

15. A tire pressure monitoring device as claimed in claim 13, wherein the tire pressure monitoring device is configured to communicate with a further tire pressure monitoring device.

16. An aircraft comprising a tire pressure monitoring device as claimed in claim 13.

* * * * *